US010013782B2

(12) United States Patent
Balmin et al.

(10) Patent No.: US 10,013,782 B2
(45) Date of Patent: Jul. 3, 2018

(54) DYNAMIC INTERACTION GRAPHS WITH PROBABILISTIC EDGE DECAY

(71) Applicant: International Business Machines Corporation, Armonk, NY (US)

(72) Inventors: Andrey Balmin, San Jose, CA (US); Peter J. Haas, San Jose, CA (US); John Sismanis, San Jose, CA (US); Yuanyuan Tian, San Jose, CA (US); Wenlei Xie, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 14/922,095

(22) Filed: Oct. 23, 2015

(65) Prior Publication Data

US 2017/0116764 A1 Apr. 27, 2017

(51) Int. Cl.
*G06T 11/00* (2006.01)
*G06T 11/20* (2006.01)

(52) U.S. Cl.
CPC .................... *G06T 11/206* (2013.01)

(58) Field of Classification Search
None
See application file for complete search history.

(56) References Cited

U.S. PATENT DOCUMENTS

| 5,615,137 | A | * | 3/1997 | Holzmann | .......... G06F 11/3608 |
| | | | | | 703/13 |
| 6,278,966 | B1 | | 8/2001 | Howard et al. | |
| 6,499,037 | B1 | * | 12/2002 | Breitbart | ........... G06F 17/30575 |
| 7,389,501 | B1 | | 6/2008 | Farouki et al. | |
| 8,676,818 | B2 | | 3/2014 | Curbera et al. | |
| 8,711,147 | B2 | | 4/2014 | Breeds et al. | |
| 8,990,777 | B2 | | 3/2015 | Gounares | |
| 2010/0153923 | A1 | * | 6/2010 | Kawahito | ................. G06F 8/70 |
| | | | | | 717/124 |
| 2011/0074786 | A1 | * | 3/2011 | Aggarwal | ............. G06T 11/206 |
| | | | | | 345/440 |
| 2011/0082670 | A1 | * | 4/2011 | McAuley | ................ G06F 17/10 |
| | | | | | 703/2 |
| 2014/0104278 | A1 | * | 4/2014 | Panigrahy | ............... G06F 17/10 |
| | | | | | 345/440 |

(Continued)

OTHER PUBLICATIONS

Demetrescu et al., "Dynamic Graph Algorithms," Chapter 9, General Concepts and Techniques, Second Edition, vol. 1, Nov. 20, 2009, pp. 9-1-9-28.

(Continued)

*Primary Examiner* — Andrew G Yang
(74) *Attorney, Agent, or Firm* — Zilka-Kotab, P.C.

(57) ABSTRACT

In one general embodiment, a computer-implemented method is provided for analyzing a dynamic graph. The computer-implemented method includes generating two or more sample graphs by sampling edges of a current snapshot of a dynamic graph. Additionally, the computer-implemented method includes generating two or more partial results by executing an algorithm on the sample graphs. Still yet, the computer-implemented method includes combining the partial results, from executing the algorithm on the sample graphs, into a final result.

22 Claims, 8 Drawing Sheets

(56) References Cited

U.S. PATENT DOCUMENTS

2016/0110409 A1* 4/2016 Rao ...................... G06F 3/0638
707/696

OTHER PUBLICATIONS

Dutot et al., "GraphStream: A Tool for bridging the gap between Complex Systems and Dynamic Graphs," Satellite Conference within the 4th European Conference on Complex Systems, Mar. 13, 2008, pp. 1-10.

IBM, "A layout method for dynamic graph visualization," IP.com, May 25, 2009, pp. 1-5.

Xie, et al., "Dynamic Interaction Graphs with Probabilistic Edge Decay," 2015 IEEE 31st International Conference on Data Engineering, Apr. 13-17, 2015, pp. 1143-1154 (Grace Period Article by the Inventor or a Joint Inventor is submitted under 35 U.S.C. 102(b)(1)(A)).

Balmin et al., U.S. Appl. No. 15/951,064, filed Apr. 11, 2018.

* cited by examiner

DYNAMIC INTERACTION GRAPHS WITH PROBABILISTIC EDGE DECAY

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): "Dynamic interaction graphs with probabilistic edge decay," Wenlei Xie; Yuanyuan Tian; Sismanis, Y.; Balmin, A.; Haas, P. J., in 2015 IEEE 31st International Conference on Data Engineering (ICDE), pp. 1143-1154, 13-17 Apr. 2015.

BACKGROUND

The present invention relates to analyzing social interactions, and more specifically, this invention relates to analyzing dynamic interaction graphs that represent social interactions.

With the increasing prevalence of social networking services and the proliferation of mobile devices in everyday life, Internet-based social interactions between people have never been so common. These social interactions can often be represented as a dynamic interaction graph, where new interactions are continuously ingested over time and represented as edges within such graphs. As a result, systems to extract timely insights from dynamically changing graphs are highly desirable.

Existing models for analyzing dynamic interaction graphs are generally divided into one of two models—the snapshot model or the sliding window model.

The snapshot model treats all interactions within the graph equally regardless of age. Because all interactions are maintained within the snapshot model, the size of the graph is unbounded, which can present processing and storage issues. Additionally, because the size of the graph is unbounded and may grow to massive portions, important recent interactions may become lost within the graph.

The sliding window model considers all graph interactions that occur within a specified recent time window. As a result of omitting from analysis graph interactions that have occurred outside of the specified time window, interactions may be abruptly removed from the analysis For example, such a sliding window model may remove from analysis all interactions beyond a two day, three week, one year, etc., window. Consequently, due to the lost continuity, important past relationships may be undesirably removed from analysis.

Accordingly, by analyzing graph interactions utilizing either the snapshot model or the sliding window model, it may be impossible to satisfy both recency and continuity requirements.

SUMMARY

In one general embodiment, a computer-implemented method is provided for analyzing a dynamic graph. The computer-implemented method includes generating two or more sample graphs by sampling edges of a current snapshot of a dynamic graph. Additionally, the computer-implemented method includes generating two or more partial results by executing an algorithm on the sample graphs. Still yet, the computer-implemented method includes combining the partial results, from executing the algorithm on the sample graphs, into a final result.

In another general embodiment, a computer program product is provided for analyzing a dynamic graph. The computer program product comprises a computer readable storage medium having program instructions embodied therewith. The program instructions are executable by a processor to cause the processor to generate two or more sample graphs by sampling edges of a current snapshot of a dynamic graph. Moreover, the program instructions are executable by the processor to cause the processor to generate two or more partial results by executing an algorithm on the sample graphs. Also, the program instructions are executable by the processor to cause the processor to combine the partial results, from executing the algorithm on the sample graphs, into a final result.

In another general embodiment, a system is provided that comprises a processor and logic integrated with and/or executable by the processor. The logic is configured to generate two or more sample graphs by sampling edges of a current snapshot of a dynamic graph. Also, the logic is configured to generate two or more partial results by executing an algorithm on the sample graphs. Moreover, the logic is configured to combine the partial results, from executing the algorithm on the sample graphs, into a final result.

Other aspects and embodiments of the present invention will become apparent from the following detailed description, which, when taken in conjunction with the drawings, illustrate by way of example the principles of the invention.

DETAILED DESCRIPTION

Figure 1:
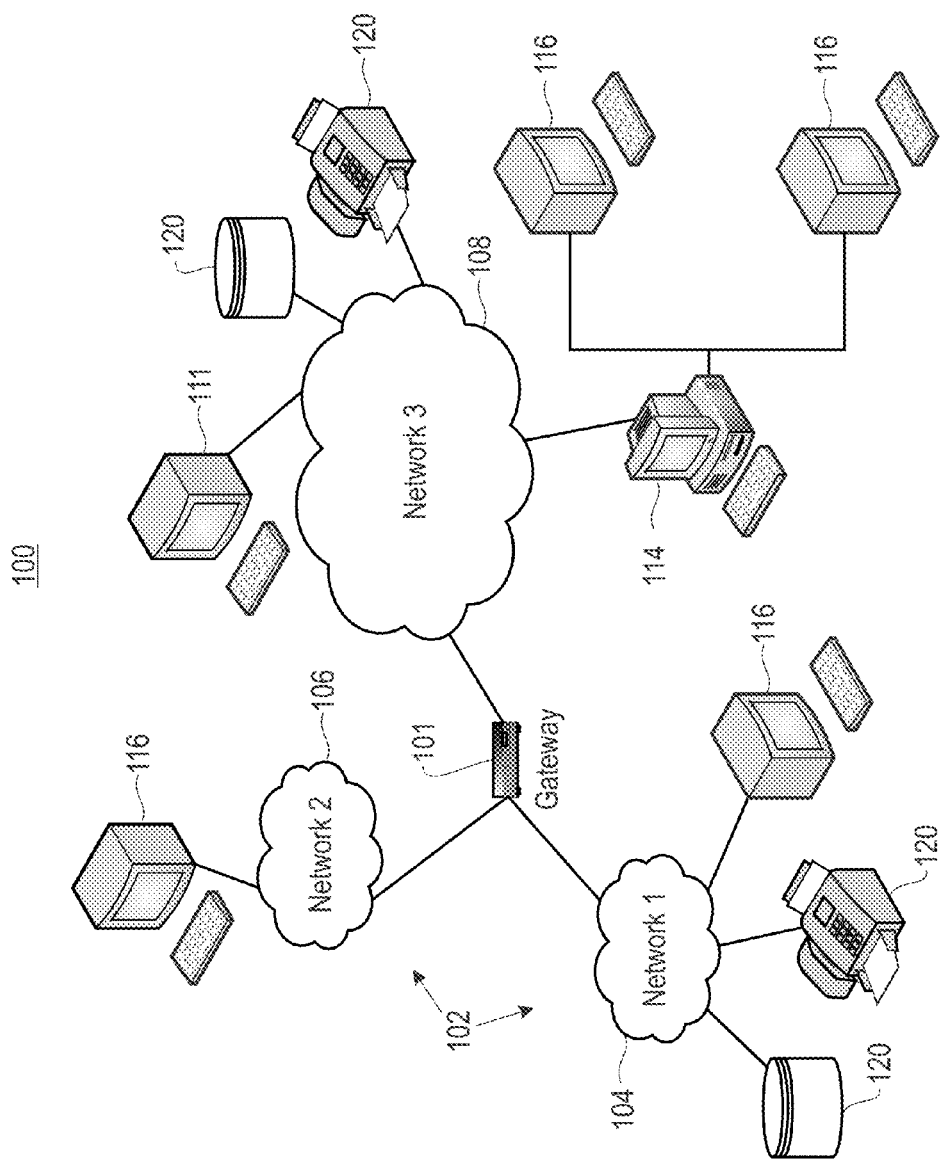
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the embodiments described herein, a snapshot of a dynamic graph may be sampled in a temporally biased manner that allows direct application of static algorithms within a dynamic environment. In the various embodiments, overlap between sample graphs at a given time may be exploited, and/or overlaps between a given sample graph at different time points may be exploited, for efficiently storing the graphs and computing results. Additionally, by tuning parameters of the dynamic environment, recency and continuity of the sample graphs may be controlled in a manner that preserves the integrity of information that might otherwise be lost using prior art snapshot and sliding window models.

The following description discloses several preferred embodiments of systems, methods, and computer program products for generating dynamic interaction graphs with probabilistic edge decay.

In one general embodiment, a computer-implemented method is provided for analyzing a dynamic graph. The computer-implemented method includes generating two or more sample graphs by sampling edges of a current snapshot of a dynamic graph. Additionally, the computer-implemented method includes generating two or more partial results by executing an algorithm on the sample graphs. Still yet, the computer-implemented method includes combining the partial results, from executing the algorithm on the sample graphs, into a final result.

In another general embodiment, a computer program product is provided for analyzing a dynamic graph. The computer program product comprises a computer readable storage medium having program instructions embodied therewith. The program instructions are executable by a processor to cause the processor to generate two or more sample graphs by sampling edges of a current snapshot of a dynamic graph. Moreover, the program instructions are executable by the processor to cause the processor to generate two or more partial results by executing an algorithm on the sample graphs. Also, the program instructions are executable by the processor to cause the processor to combine the partial results, from executing the algorithm on the sample graphs, into a final result.

In another general embodiment, a system is provided that comprises a processor and logic integrated with and/or executable by the processor. The logic is configured to generate two or more sample graphs by sampling edges of a current snapshot of a dynamic graph. Also, the logic is configured to generate two or more partial results by executing an algorithm on the sample graphs. Moreover, the logic is configured to combine the partial results, from executing the algorithm on the sample graphs, into a final result.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
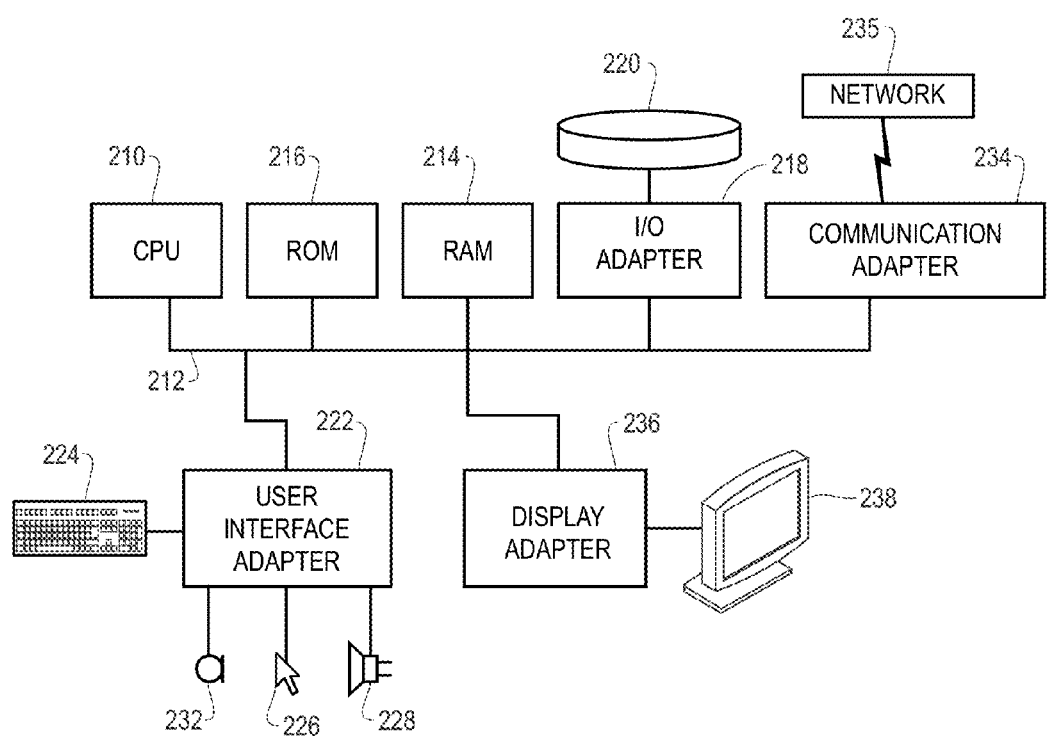
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235

(e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3A:
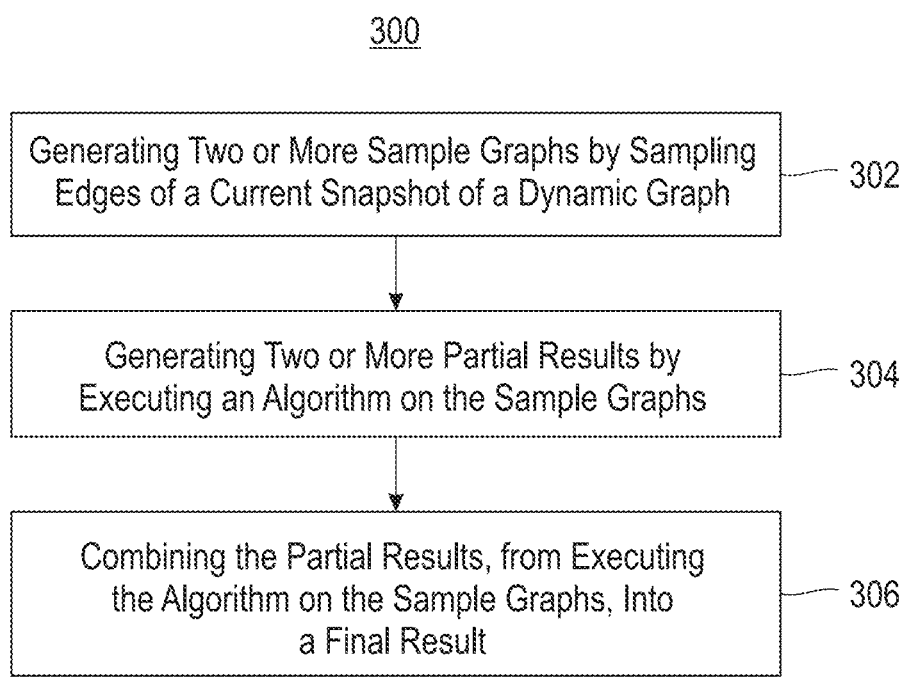
FIG. 3A illustrates a method for combining results, from executing an algorithm on multiple sample graphs, into a final result, in accordance with one embodiment.

Now referring to FIG. 3A, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more processors, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, method 300 initiates with operation 302, where two or more sample graphs are generated by sampling edges of a current snapshot of a dynamic graph. In some embodiments, the sampling may include a subsampling operation, as discussed in more detail below.

As used herein, a graph may include any representation of a system of interactions between two or more entities, where the interactions between the entities are represented as edges within the graph. Further, the entities may be represented as vertices within the graph. The interactions may include connections, relationships, conversations, phone calls, text messages, chats, tweets, etc. Each interaction may be associated with a timestamp that indicates when the interaction occurs. In one embodiment, the interactions may include chats directed between users of a social network. For example, the interactions may include tweets directed to/from users of Twitter. Further, a dynamic graph includes any graph wherein the set of entities and/or interactions within the graph may change over time. A current snapshot of a dynamic graph comprises the cumulative contents of the graph (entities and interactions) occurring with the system from an initial time up until a current or given time, t.

Figure 3B:
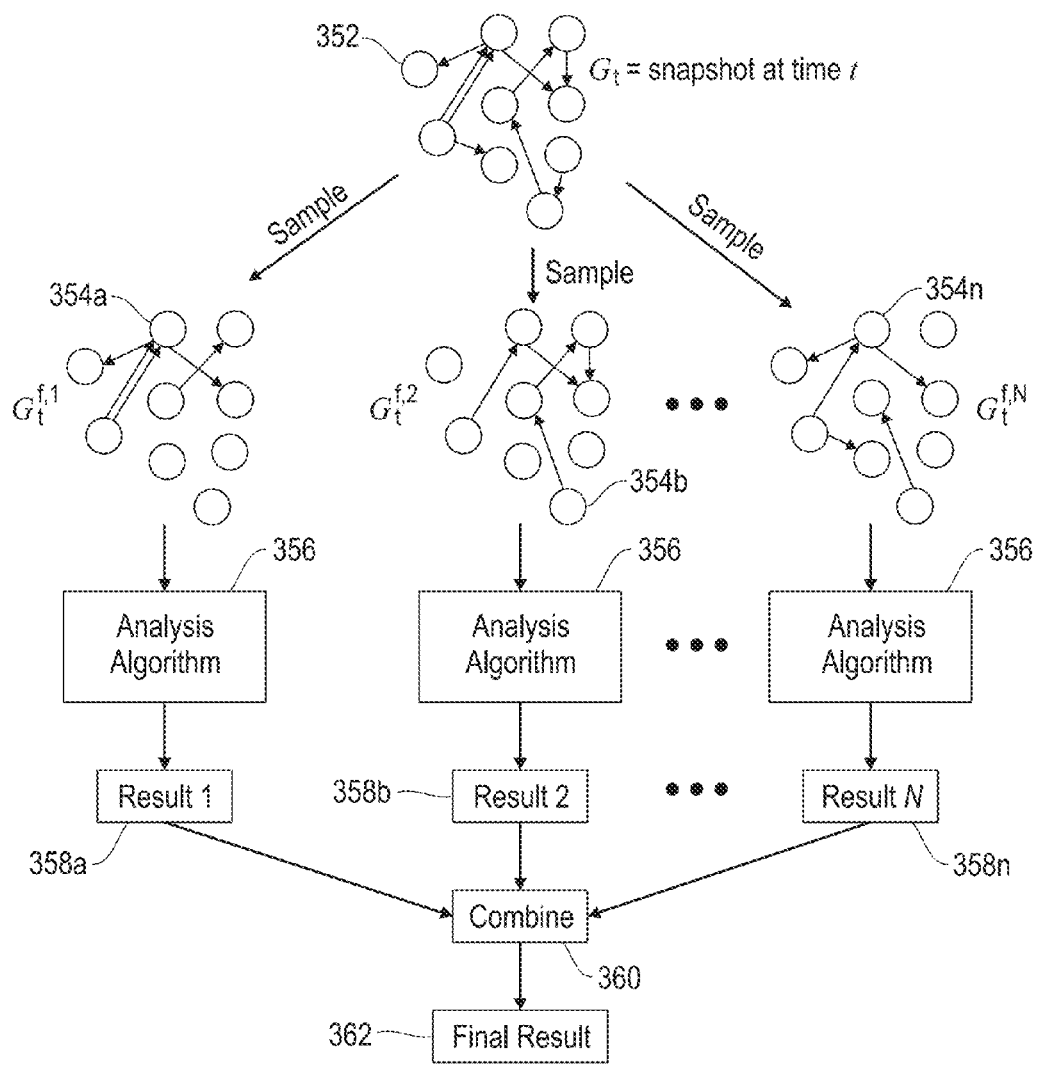
FIG. 3B illustrates combining results, from executing an algorithm on multiple sample graphs, into a final result, in accordance with another embodiment.

For example, referring to FIG. 3B, a cumulative snapshot 352 is a snapshot of a graph G for time interval [0, t]. As reference herein, the snapshot 352 may also be identified as snapshot Gt. The snapshot 352 is shown to include a plurality of entities (i.e., the dots or vertices), and a plurality of interactions between the entities (i.e., the edges or lines connecting the entities).

Moreover, sampling the edges of the current snapshot may comprise any operation that selects a subset of the edges of the snapshot for inclusion in one or more of the sample graphs. Accordingly, in various embodiments, a given sample graph of the two or more sample graphs may include a different subset of edges of the current snapshot than any of the other sample graphs.

For example, referring again to FIG. 3B, a plurality of sample graphs 354 (354a, 354b . . . 354n) have been generated by sampling the edges of the snapshot 352. As shown in FIG. 3B, although each of the sample graphs 354 contain the same vertices, each of the sample graphs contains a different subset of edges connecting the vertices. More specifically, although some edges are shown included in more than one of the sample graphs 354, the sample graph 354a is shown to include a different set of edges than the edges of the sample graph 354b and the sample graph 354n, and the sample graph 354b is shown to include a different set of edges than the edges of the sample graph 354n. As an option, in any sample graph there may be multiple edges connecting two given vertices, and each of the edges may be associated with a different timestamp.

In some embodiments, sampling the edges of the snapshot of the dynamic graph includes sampling the edges according to a decay function. As a result, each interaction (represented by an edge) of a snapshot of a dynamic graph may have an independent probability of appearing in a resulting sample graph, where this probability is non-increasing with the age of the interaction. Moreover, by sampling the edges of the snapshot of the dynamic graph using a decay function, the sampling of the snapshot may be temporally biased. Temporally-biased sampling ensures that, with high probability each sample graph contains both recently-created edges and older edges, with more of the former than the latter.

Moreover, by generating a plurality of independent sample graphs, sampling variability may be controlled. A number N of sample graphs generated at operation 302 and comprising the two or more sample graphs may be used to control a precision of the final result obtained at operation 306, which is discussed in more detail below. In addition, the partial results may be used to control variability introduced by the sampling of the process used to generate the sample graphs.

In various embodiments, each edge of a snapshot may be associated with a timestamp. For example, each edge may be associated with an arrival timestamp or a creation timestamp. Where a given edge is represented as e, the timestamp of the edge may be represented as t(e). Further, where a decay function, f, is utilized to select edges for inclusion in a sample graph, as discussed in more detail below, then a given edge e may be included in the sample with a probability of $f(t-t(e))$, where f is positive and strictly decreasing. Then at any time t, every edge, e, with $t(e) \leq t$ has a non-zero chance of being included in the analysis, but the edge becomes increasingly less important in the analysis over time, and newer edges are more likely to be included in a graph analysis.

It should be noted that, both the snapshot model and the sliding window model of the prior art may be implemented as special cases within the probabilistic edge decay model disclosed herein. In particular, the snapshot model may be implemented as a special case where $f \equiv 1$, such that no edges are removed from the sample graphs due to decay; and the sliding window model may be implemented as a special case where $f(a)=I(a \leq w)$, where $I(X)$ denotes an indicator of event X such that within a desired time window the probability of edge inclusion is always 1, and outside of the desired time window the probability of edge inclusion is always 0.

Accordingly, in general, as time advances, the age of the given edge e increases, and the inclusion probability of the edge either decreases or remains unchanged.

In one embodiment, the edges of the current snapshot of the dynamic graph may be sampled using an exponential decay function of the form f(a)=pa for some decay probability, p, where 0<p<1. As an option, p may be chosen based on a targeted edge/interaction survivability. For example, when p=0.8, then approximately 0.1% of interactions from 30 time intervals ago may be maintained. For another example, when p=0.825, a vertex with 1,000 interactions 60 time intervals ago is likely to still be present in a sample graph. In one specific embodiment, p=0.8. Utilizing an exponential decay function may ensure that a space requirement for storing the sample graphs of the dynamic graph is bounded with high probability. Further, adjustment of the exponential decay function may be used to control how rapidly edges are removed from sample graphs.

In some embodiments, the sample graphs may be aggregated for storage. By storing the sample graphs as an aggregate graph, overlap between the sample graphs may be exploited to enable storage of the sample graphs in a space-efficient manner. In other words, because the sample graphs are generated by sampling the same snapshot of the dynamic graph, there may be substantial similarities between the different sample graphs. By taking advantage of the similarities, the sample graphs may be accumulated into a single aggregate graph for storage purposes. Maintaining a single aggregate graph that includes the edges of numerous sample graphs may reduce storage requirements.

In the various embodiments, time may be partitioned into discrete intervals of a given length. For example, time may be partitioned into discrete intervals of n seconds, minutes, hours, days, etc. Further, updates made to the dynamic graph (e.g., new edges, etc.) may be viewed as arriving in batches, such that all updates of a given batch occur during a single interval. As an option, any new edges included in a most recent update to a dynamic graph may be added to the dynamic graph with a sample probability of 1, to ensure that the new edges are included in all of the sample graphs generated using the dynamic graph.

If time is partitioned into discrete intervals and arriving edges are batched, if M is the maximum size of an update batch of new edges, and if $f(k)=p^k$ is the applied exponential decay function (where k is the age in batches of an edge), then an expected number of edges in an aggregate graph of N sample graphs may be bounded by $$M\left[\log_{\frac{1}{p}}(N)\right] + \frac{M}{1-p},$$

where [x] notes the smallest integer greater than or equal to x. As a result, the number of edges that may need to be stored may be reduced from O(M·N) for an approach that does not utilize an aggregate graph, to O(M·log N) with implementation of an aggregate graph. By way of example, when p=0.8, N=96, and M=10 million, the number of stored edges may be reduced from about 4.8 billion edges to about 250 million edges using an aggregate graph.

Figure 4A:
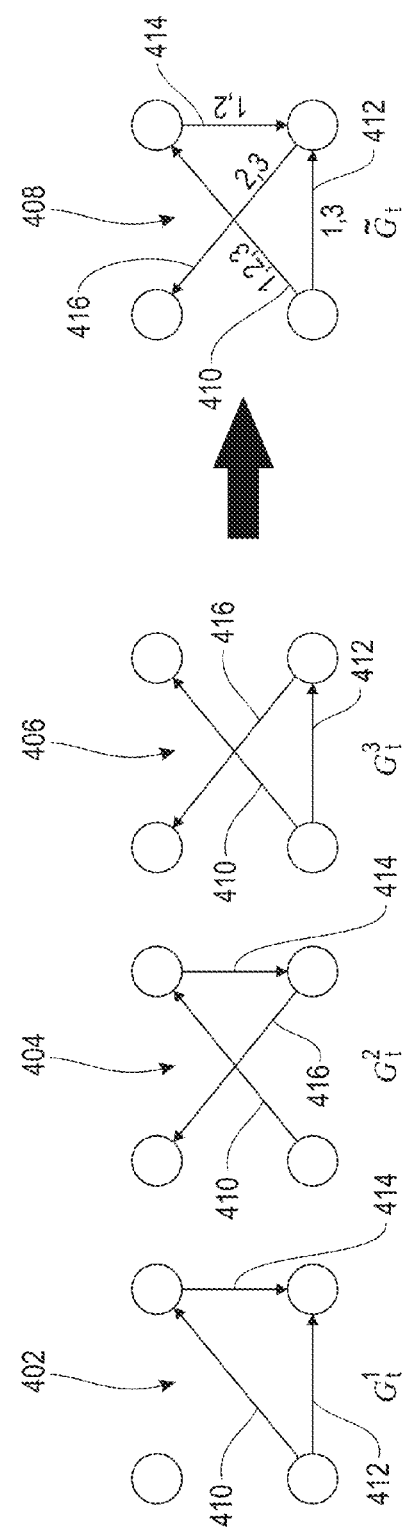
FIG. 4A illustrates the creation of an aggregate graph, in accordance with one embodiment.

As illustrated by FIG. 4A, an aggregate graph 408 is shown created based on the edges of sample graphs 402, 404, and 406. As an option, the aggregate graph 408 may be created by performing a union of the edges of sample graphs 402, 404, and 406.

The attributes of an edge appearing in multiple sample graphs may only need to be stored once in the aggregate graph. Further, for each aggregate edge, the one or more sample graphs to which the edge belongs may be tracked.

For example, with continued reference FIG. 4A, edge 410 is shown included in each of the sample graphs 402, 404, and 406. However, edge 412 is shown included only in the sample graphs 402 and 406. Similarly, edge 414 is shown included only in the sample graphs 402 and 404, and edge 416 is shown included only in the sample graphs 404 and 406. Accordingly, the aggregate graph 408 is shown to include all edges found in the sample graphs 402, 404, and 406. In particular, as shown in FIG. 4A, the aggregate graph 408 includes each of the edges 410, 412, 414, and 416 that comprise the individual sample graphs 402-406.

Further, each of the edges in the aggregate graph 408 may be associated with a notation that reflects the sample graphs to which the edge belongs. For example, within the aggregate graph 408, the edge 410 is shown associated with notation reflecting that the edge 410 is present in sample graphs 1, 2, 3, which, within the context of FIG. 4A, correspond to the sample graphs 402, 404, and 406, respectively. Similarly, the edge 412 is shown associated with notation reflecting that the edge 412 is present in sample graphs 1 and 3, which, within the context of FIG. 4A, corresponds to the sample graphs 402 and 406, respectively. Still yet, the edge 414 is shown associated with notation reflecting that the edge 414 is present in sample graphs 1 and 2, which, within the context of FIG. 4A, corresponds to the sample graphs 402 and 404, respectively. Finally, the edge 416 is shown associated with notation reflecting that the edge 416 is present in sample graphs 2 and 3, which, within the context of FIG. 4A, corresponds to the sample graphs 404 and 406, respectively.

Of course, the notation for each of the edges may be stored in any practicable manner. As an option, the notation for each of the edges may be stored as bitmap. In one embodiment, a different bitmap may be stored for each edge, where the length of the bitmaps corresponds to the number of sample graphs. In other words, N sample graphs may be stored together in an aggregate graph. Further, a bitmap of length N may be associated with each edge in the aggregate graph, to indicate the sample graphs to which an edge belongs.

Figure 4B:
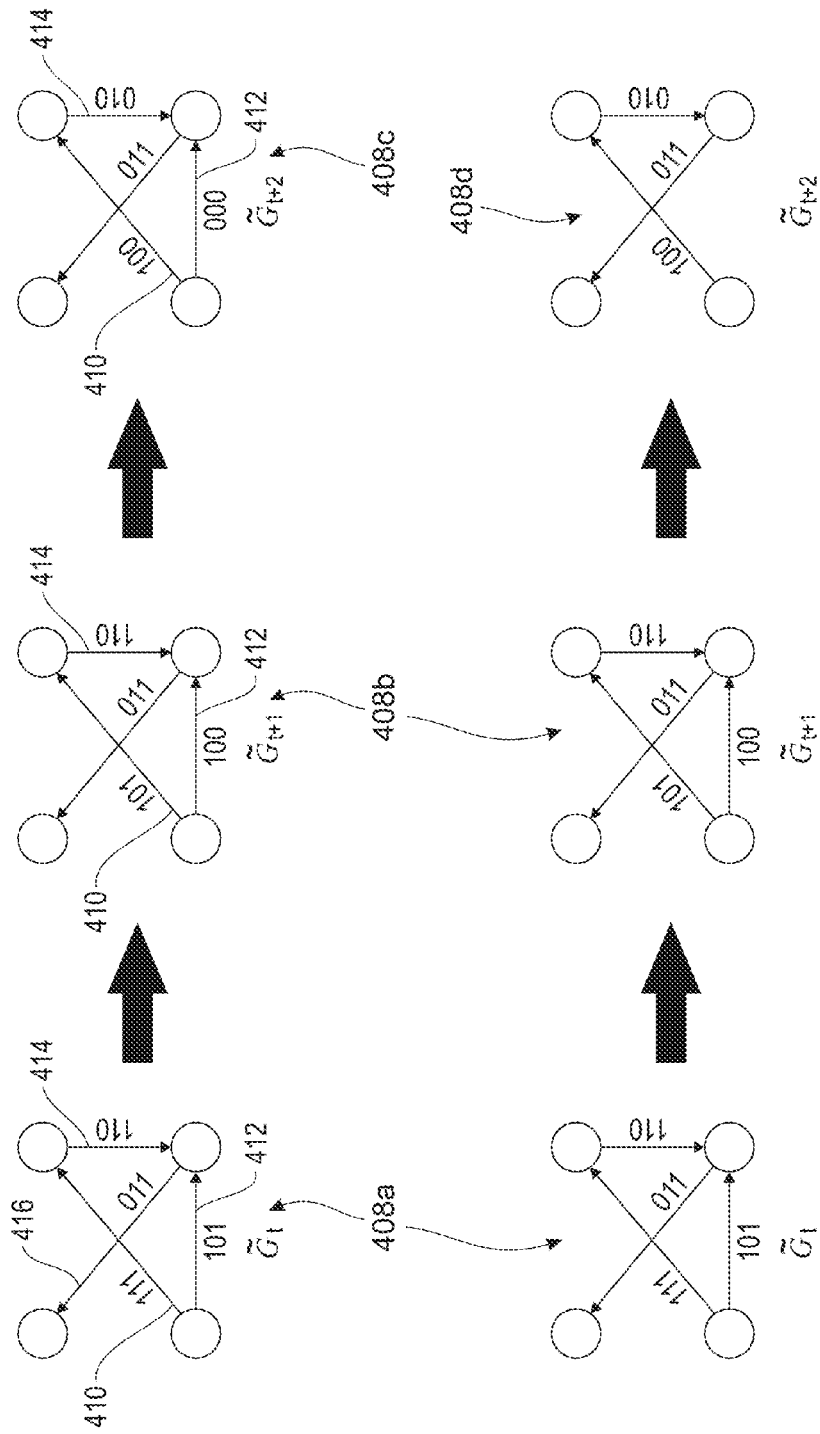
FIG. 4B illustrates graph maintenance utilizing eager incremental updating, in accordance with another embodiment.

For example, as shown in FIG. 4B, aggregate graph 408a comprises a version of the aggregate graph 408 wherein all edges of the aggregate graph 408 are associated with a bitmap. Further the length of the bitmaps corresponds to the number of sample graphs. In other words, each bitmap has a length of 3 bits, each bit corresponding to one of the 3 sample graphs 402, 404, and 406.

More specifically, the first bit in each bitmap corresponds to the sample graph 402 (i.e., sample graph 1), the second bit in each bitmap corresponds to the sample graph 404 (i.e., sample graph 2), and the third bit in each bitmap corresponds to the sample graph 406 (i.e., sample graph 3). Accordingly, an ith sample graph may correspond to the ith bit position in each of the edge bitmaps.

Further, as shown in FIG. 4B, a 1 bit in an edge bitmap may be utilized to represent the presence of the edge in the sample graph corresponding to the position of the bit, and a 0 bit in the edge bitmap may be utilized to represent the absence of the edge in the sample graph corresponding to the position of the bit. In other words, the bitmap of 111 associated with the edge 410 indicates that the edge 410 is present each of the first sample graph 402, the second sample graph 404, and the third sample graph 406. Moreover, the bitmap of 101 associated with the edge 412 indicates that the edge 412 is present in the first sample graph 402 and the third sample graph 406, but is absent from the second sample graph 404. Similarly, the bitmap of 110 associated with the edge 414 indicates that the edge 414 is present in the first sample graph 402 and the second sample graph 404, but is absent from the third sample graph 406.

As a result then, in embodiments storing the sample graphs as an aggregate graph with a bitmap notation for each edge, whenever a new edge is first added to the dynamic graph (i.e., the edge has arrived within a batch for a given time interval), the edge may appear in all sample graphs, and a bitmap of length N may be set to contain N 1-bits (i.e., a 1 at every bit position). As time goes by, a previously received edge will gradually disappear from some or all sample graphs, as discussed in more detail below. In this manner, sampling of the dynamic graph may be temporally biased with respect to new edges in the dynamic graph.

In some embodiments, as time is incremented from a first time, t, to a second time, for example (t+1), the dynamic graph may be sampled to materialize a new set of N sample graphs from scratch for the second time. However, generating N new sample graphs from scratch for each time may be prohibitively expensive, especially for large dynamic graphs.

In other embodiments, the sample graphs may be incrementally maintained or updated. In other words, instead of generating the N sample graphs from scratch for time t+1, the edges of the sample graphs from t may be subsampled based on decay probability, and a result of the subsampling may be combined with edges arriving in a batch for time t+1. In other words, each edge in each of the sample graphs may be evaluated with the decay probability, p, to determine whether the edge remains within the incremental update of the sample graph, and the remaining edges are then combined with newly received edges to generate new sample graphs. The new sample graphs may replace the sample graphs from the previous time. In this manner, each of the sample graphs may be incrementally updated to reflect a state of the sample graph at a current or subsequent time without needing to resample from scratch a snapshot of the dynamic graph.

Moreover, by incrementally updating the sample graphs, instead of naively sampling a current snapshot of the dynamic graph, overlap between realizations of a given sample graph at successive time points may be exploited to increase the efficiency of incremental graph analysis, and storage requirements for the sample graphs may be bounded with a high probability. Specific embodiments for incrementally updating the sample graphs are described below in further detail.

In various embodiments, the sample graphs comprising an aggregate graph may be maintained using an incremental sample-maintenance method. In one embodiment, the sample graphs may be updated for successive time intervals using an approached referred to herein as eager incremental updating. Eager incremental updating may exploit the storage of N sample graphs together in the single aggregate graph, and is described within the context of FIG. 4B.

Referring to FIGS. 4A and 4B, the aggregate graph 408 is associated with a given time, t. As noted above, the aggregate graph 408a comprises a version of the aggregate graph 408 at t wherein all edges of the aggregate graph 408 are associated with a different bitmap. As time progresses to a subsequent time, t+1, each of the edges of the aggregate graph 408a may be subsampled to determine a new set of sample graphs, and, consequently, a new aggregate graph. For example, as shown in FIG. 4B, the aggregate graph 408a is subsampled to generate aggregate graph 408b, and the aggregate graph 408b is subsampled to generate aggregate graph 408c.

As noted above, whenever a new edge is first added to the dynamic graph (i.e., the edge has arrived within a batch for a given time interval), a bitmap of length N may be associated with the edge, where the bitmap contains N 1-bits (i.e., a 1 at every bit position) because the edge appears in all sample graphs. As time goes by, the new edge will gradually disappear from some or all of the sample graphs. When an edge is removed from an ith sample graph of the N sample graphs, the ith bit of the bitmap may be updated from a 1 to a 0.

Subsampling of the edges of the aggregate graph 408a may be implemented by applying a Bernoulli trial with probability p to each edge in each sample graph where the edge still exists. For example, at each subsequent batch arrival time or time interval, a Bernoulli trial with probability p may be applied to a given edge for each sample graph where the given edge still exists. It should be noted that with the application of incremental updating, an edge e that does not appear in the aggregate graph at time t will not appear in the aggregate graph for any time t' subsequent to t. As a result, a memory bound may be established that is significantly smaller than that of a naive snapshot sampling approach.

Thus, within the context of FIG. 4B, for each update or time interval, each edge-tracking bitmap may be scanned, and for each bit within the bitmap that equals 1, the bit is set to 0 with a probability of 1−p. Once a bitmap contains all 0s, the edge associated with the bitmap no longer exists in any of the sample graphs, and the edge may be removed from the aggregate graph.

By way of example, and with specific reference to FIG. 4B, as time progresses from t to t+1, a Bernoulli trial with probability p is applied to each 1 bit within the bitmaps associated with edges 410, 412, 414, and 416. As a result, two 1s are removed from the bitmaps. Specifically, the bitmap 111 associated with the edge 410 at time t (indicating that the edge 410 is present in each of the first sample graph 402, the second sample graph 404, and the third sample graph 406 at time t), is updated to bitmap 101 at time t+1 (indicating that the edge 410 is present in each of the first sample graph 402 and the third sample graph 406, but is no longer present within the second sample graph 404, at t+1).

Similarly, the bitmap 101 associated with the edge 412 at time t (indicating that the edge 412 is present in each of the first sample graph 402 and the third sample graph 406 at time t), is updated to bitmap 100 at time t+1 (indicating that the edge 412 is now only present in the first sample graph 402, and is no longer present within the third sample graph 406 at t+1).

Still yet, as time progresses from t+1 to t+2, another Bernoulli trial with probability p is applied to each 1 bit within the bitmaps associated with the edges 410, 412, 414, and 416. As a result, three 1s are removed from the bitmaps.

Specifically, the bitmap 101 associated with edge 410 at time t+1 (indicating that the edge 410 is present in each of the first sample graph 402 and the third sample graph 406 at t+1), is updated to bitmap 100 at time t+2 (indicating that the edge 410 is now only present in the first sample graph 402, and is no longer present within the third sample graph 406 at t+2).

Similarly, the bitmap 110 associated with the edge 414 at time t+1 (indicating that the edge 414 is present in each of the first sample graph 402 and the second sample graph 404 at t+1), is updated to bitmap 010 at time t+2 (indicating that the edge 414 is now only present in the second sample graph 404, and is no longer present within the first sample graph 402 at t+2).

Finally, the bitmap 100 associated with the edge 412 at time t+1 (indicating that the edge 412 is present in only the first sample graph 402), is updated to bitmap 000 at time t+2 (indicating that the edge 412 is no longer present in any of the sample graphs 402-406 at t+2). When an edge is no longer included in any of the sample graphs comprising an aggregate graph, then the edge may be removed from the aggregate graph. Accordingly, when the bitmap associated with edge 412 includes N 0 bits (i.e., a 0 at every position), the edge 412 may be removed from the aggregate graph, as illustrated in aggregate graph 408d at time t+2.

In another embodiment, the sample graphs comprising an aggregate graph may be updated at successive time intervals using an approached referred to herein as lazy incremental updating. The lazy incremental updating approach may exploit the observation that the life span, $L^i_e$, of an edge, e, in an ith sample graph follows a geometric distribution. In particular, the life span, $L^i_e$, is the time from when the edge arrives until it is permanently removed from the ith sample graph via a Bernoulli subsampling step. As noted above, a given edge, e, may appear in all sample graphs when the edge first arrives at a given time interval, so $L^i_e \geq 1$.

Accordingly, the lazy incremental updating method may avoid materializing the bitmaps utilized for eager incremental updating and discussed in the context of FIG. 4B. More specifically, for an edge, e, that is added to an ith sample graph of N sample graphs, the life span of the edge, $L^i_e$, in each of the sample graphs may be directly generated or sampled, instead of stored. Then, based on a time stamp of the edge, and the life span of the edge, it may be determined when the edge will be removed from inclusion in the ith sample graph. The lazy incremental updating method is described in more detail below, within the context of FIG. 5.

To track the life span of each edge in each sample graph, N integers may be deterministically materialized on-demand in a manner that approximately maintains mutual statistical independence. As an option, a hash function may be used. For example, in one particular embodiment, a 64-bit version of the MurmurHash3 random hash function may be used to generate a life span of a given edge in a given sample graph. In such an example, given a unique combination of an edge ID and a sample graph ID, the hash function may deterministically and efficiently generate an integer (e.g., the 64-bit version of the MurmurHash3 random hash function may generate a 64-bit integer). Integers generated using the hash function may then be converted into pseudorandom samples from the geometric distribution of the life span of the edges, for example by setting U=H(edgeID, graphID)/$2^{64}$ and then L=[ln U/ln p]+1, where H is the applied hash function.

Figure 5:
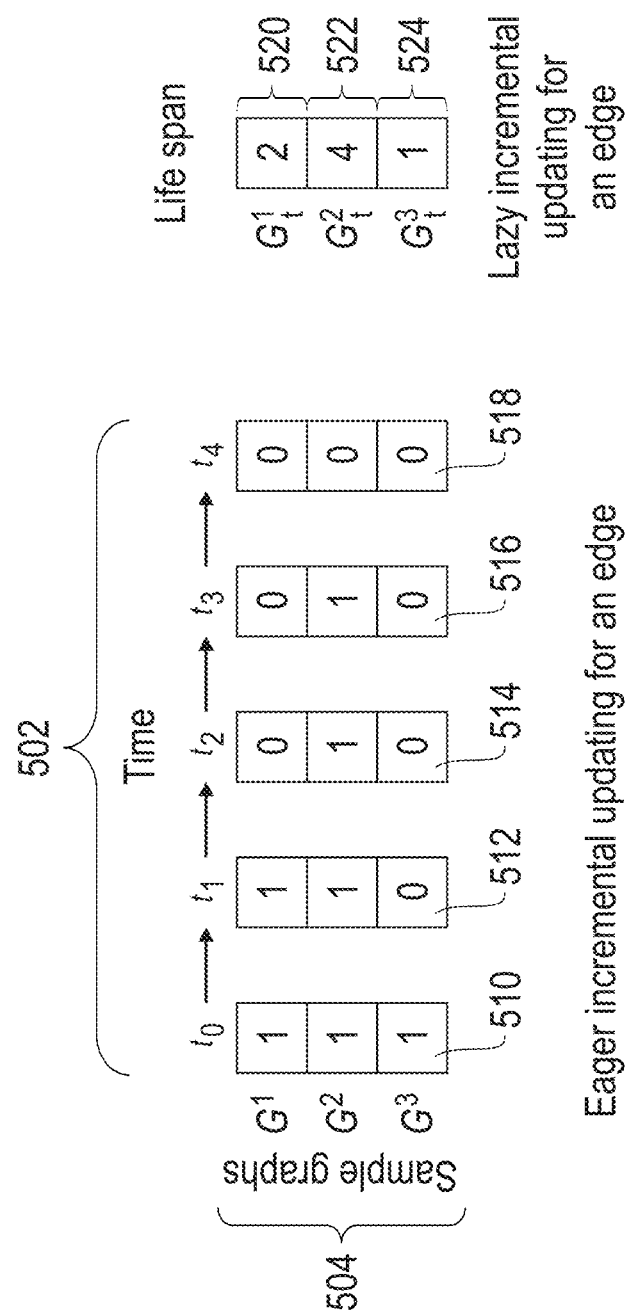
FIG. 5 illustrates graph maintenance utilizing lazy incremental updating, in accordance with yet another embodiment.

A comparison of eager incremental updating with lazy incremental updating is illustrated by way of FIG. 5. For example, referring to FIG. 5, when eager incremental updating is implemented, then for a given edge that is included in a set of sample graphs 504 (where each sample graph is represented as one of $G^1$, $G^2$, and $G^3$) at a first time, to, a bit of 1 may be set in each corresponding position of bitmap 510, as discussed above. Further, at each subsequent batch arrival time or time interval, a Bernoulli trial with probability p may be applied to the given edge for each sample graph where the given edge still exists.

In the context of FIG. 5, at a second time, $t_1$, the edge is probabilistically removed from the third sample graph, $G^3$, as represented by bitmap 512. Similarly, at a third time, $t_2$, the edge is probabilistically removed from the first sample graph, $G^1$, as represented by a bitmap 514. The edge included in the second sample graph, $G^2$, survives application of the successive Bernoulli trials until a fifth time period, $t_4$, at which point the edge is no longer included in any of the three sample graphs 504, as illustrated by bitmaps 516 and 518. As discussed above, the bitmaps 512, 514, 516, and 518 may be updated for each respective time to reflect the inclusion of the edge within the different sample graphs $G^1$, $G^2$, and $G^3$ of the set of sample graphs 504.

As demonstrated by the lazy incremental updating approach, a life span for the edge across time period 502 may be directly calculated as two time intervals 520 within the first sample graph, $G^1$, as four time intervals 522 within the second sample graph, $G^2$, and as one time interval 524 within the third sample graph, $G^3$. As noted above, the life spans for the edge across the different sample graphs may follow a geometric distribution based on a decay function applied to the edge. Using such a geometric distribution, the life span for a given edge in a given sample graph may be determined or computed on-demand using a hash function that returns the life span, rather than tracking each edge separately using notation such as a bitmap. The life span returned from an on-demand computation may then be compared to the age of the edge and/or the current time to determine whether or not the edge should be removed. For example, if the age of the edge is greater than or equal to the life span of the edge, then the edge may be removed from the respective sample graph for the current and subsequent times. The age of the edge may be determined, for example, using a time stamp of the edge, a time interval during which the edge was receive, a most recent time interval, and/or the current time.

Returning now to FIG. 3, at operation 304, two or more partial results are generated by executing an algorithm on the sample graphs. In other words, rather than executing the algorithm against the current snapshot of the dynamic graph, the algorithm may be executed against the independent two or more sample graphs to generate two or more partial results.

As used herein, the algorithm may include any analytical function capable of application to a snapshot of the dynamic graph. For example, the algorithm may include a compute function that is invoked on each vertex of the sample graphs to change the state of each of the vertices, and adjacent edges of each of the vertices. Moreover, changes to other vertices may be propagated, for example, through either message passing (e.g., in Pregel, etc.) or scheduling of updates (e.g., in GraphLab, etc.). Still yet, the compute function may be carried out iteratively until there is no status change for any vertex.

In some embodiments, executing the algorithm on the sample graphs includes executing the algorithm on one or more bulk sets containing the sample graphs. Executing the algorithm on a bulk set may include simultaneously executing the algorithm on any two or more sample graphs included in the bulk set, or on an aggregate graph comprising the two or more sample graphs included in the bulk set.

For example, in one embodiment, when generating the partial results by executing the algorithm on the sample graphs, the algorithm may be executed against an aggregate graph comprising the sample graphs, instead of being executed once for each of the sample graphs. Because of the significant overlap between the sample graphs, executing the algorithm against the aggregate graph may increase the efficiency of the algorithm and generating the partial results, as discussed in more detail below.

In another embodiment, N sample graphs comprising an aggregate graph may be partitioned into one or more bulk sets comprising s sample graphs, where s is ≤N. For example, s may be configured such that each bulk set includes 4, 8, 16, 32, 64, etc. sample graphs. Then, for each bulk set, the s sample graphs may be combined into a partial aggregate graph, and the algorithm may be executed against each of the partial aggregate graphs as a whole, instead of processing the s sample graphs individually. In other words, the algorithm may be executed simultaneously against all of the sample graphs in a given bulk set. The state of a vertex or an edge in a partial aggregate graph may be an array of the states of the corresponding vertices or edges, respectively, in the s sample graphs of the partial aggregate graph. As an option, if an edge does not appear in a sample graph, then the associated array element may be NULL.

The number s of sample graphs in a bulk set may be a tunable parameter. A larger value of s may enable shared computation among more sample graphs, and accordingly more benefit from compression of vertex/edge states and combined updates, but may be associated with higher memory requirements for each bulk set execution. Accordingly, the number of bulk sets, and the size of the bulk sets may be adjusted based on available memory.

Computation at a vertex, v, in a partial aggregate graph may proceed by looping through the s sample graphs, reconstructing the set of v's adjacent edges in each sample graph, and applying a compute function. The resulting updates to other vertices may then be grouped by destination vertex ID, and the combined updates may be propagated via message passing or scheduling of updates. After execution completes against a bulk set, then next bulk set may be processed, until all of the N sample graphs have been processed.

Figure 6:
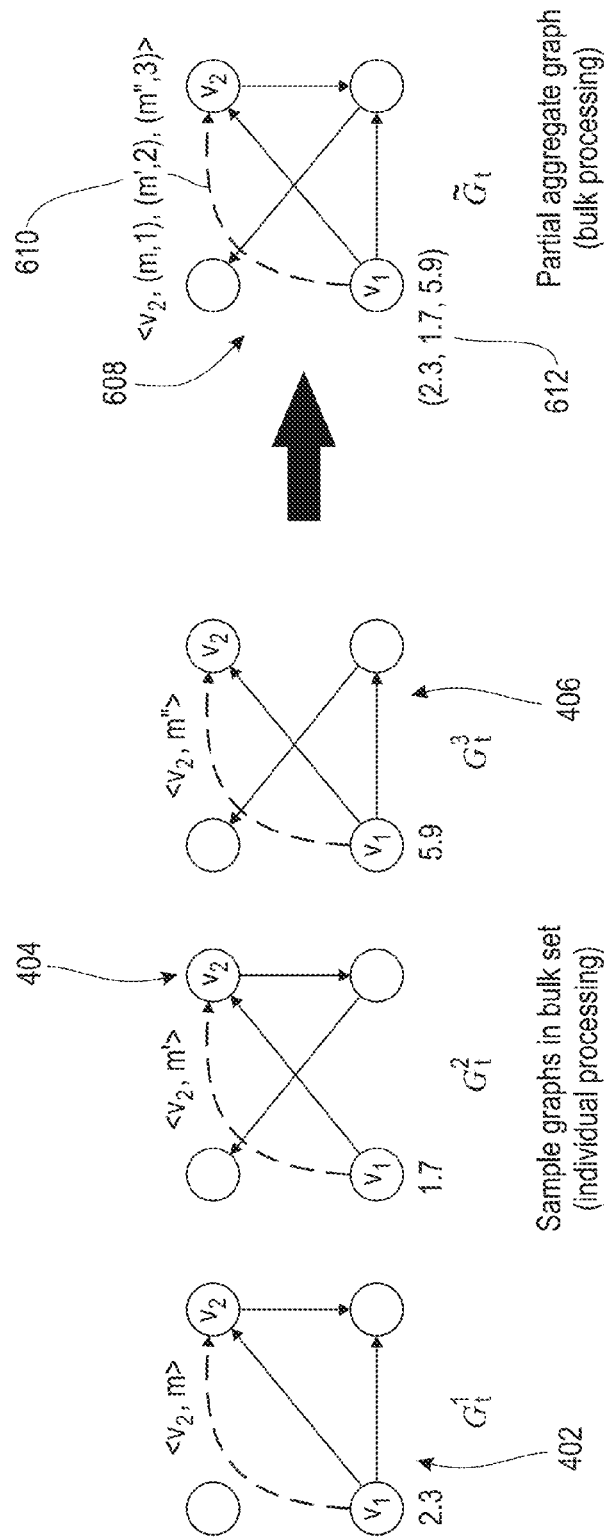
FIG. 6 illustrates combining sample graphs into a partial aggregate graph for bulk set execution, in accordance with one embodiment.

For example, referring to FIG. 6, sample graphs are shown combined into a partial aggregate graph for bulk set execution. More specifically, the sample graphs 402, 404, and 406 are shown combined into partial aggregate graph 608, for bulk set processing. Although, the partial aggregate graph 608 is shown to comprise three sample graphs, it is understood that a partial aggregate graph may comprise any number of sample graphs. Further, there may be one or more additional partial aggregate graphs, each comprising other sample graphs.

As illustrated by FIG. 6, vertex $v_1$ is present in each of the sample graphs 402, 404, and 406. During executing of a compute function against each of the sample graphs 402, 404, and 406, the vertex $v_1$ would send a message to vertex $v_2$. In particular, during execution of the compute function against the sample graph 402, the initial state of vertex $v_1$ is 2.3, and after computation, vertex $v_1$ would send message m to the vertex $v_2$; during execution of the compute function against the sample graph 404, the initial state of vertex $v_1$ is 1.7, and after computation, the vertex $v_1$ would send message m' to the vertex $v_2$; and during execution of the compute function against the sample graph 406, the initial state of vertex $v_1$ is 5.9, and after computation, the vertex $v_1$ would send message m" to the vertex $v_2$.

However, rather than separately executing the compute function against each of the sample graphs 402, 404, and 406, the compute function may be executed against the partial aggregate graph 608 by consolidating the initial state of vertex $v_1$ into an aggregate initial state 612, and consolidating the messages m, m', and m" (from the vertex $v_1$ to the vertex $v_2$) into aggregate message 610. As an option, the aggregate message 610 may include a graph identifier for each message comprising the aggregate message 610, where the graph identifier identifies from which sample graph the message originated. In other words, the aggregate message 610 may include, in addition to each of the messages m', m", and m'", a graph identifier for each of the messages that identifies from which sample graph the message originated.

As a result of the aggregate message 610, three computations on vertex 1 may be performed simultaneously for the sample graphs comprising the partial aggregate graph 608.

An algorithm for bulk execution of a graph algorithm according to one specific embodiment, wherein message passing is used for update propagation, is provided as pseudocode in Table 1. Of course, such pseudocode is provided as an option, and should not be construed as limiting in any manner.

TABLE 1 input: A vertex v in a partial aggregate graph of s sample graphs, its
    adjacent edges $E_V$, and its incoming messages inMsgs
initialize msgs =Ø; // each element is in the form <dest vertex id, message,
    sample graph id>
for i=1 to s do
    construct a new vertex $v_i$ where $v_i$.state = v.state[i];
    $inMsgs_i$=inMsgs.getMsgsForGraph(i);
    initialize $v_i$'s adjacent edges $E_{V_i}$ = Ø;
    foreach e ∈ $E_V$ do
        if e is in the ith sample graph then☐
            construct $e_i$ where $e_i$.state = e.state[i];
            $E_{V_i}$.add($e_i$) ;
    orgMsgs=compute($v_i$, $E_{V_i}$, $inMsgs_i$); call user defined function
    msgs.add(attachGraphID(orgMsgs, i));
    v.state[i] = $v_i$.state;
    foreach $e_i$ ∈ $E_{V_i}$ do
        e is the corresponding edge in $E_V$;
        e.state[i] = $e_i$.state;
output: The combined messages grouped by dest vertex id:
    grpMsgs=msgs.groupByDest( )

Executing the algorithm against bulk sets in groups of size s may amortize the cost of the nontrivial step of generating the bulk sets, and aggregating messages between vertices. Because graph traversal requires many random memory accesses, bulk execution of computations on the same vertex across different sample graphs may result in local computations that yield improved caching behavior. In other words, memory locations that are accessed during intermediate computations involving such a vertex tend to be adjacent, hence appear jointly in the cache, thereby increasing compute performance; such memory locality would not occur if the sample graphs were processed separately.

Additionally, the similar messages and similar message values, when combined in an aggregate message sent from one vertex to another, may create opportunities for compression during communication over a network. In other words, because the states of two or more sample graphs may be similar, due to overlaps in edges, vertices, etc., the contents of messages from a vertex during computation are likely to be similar, and thus may be effectively compressed. As an option, compression may also be applied when persisting the similar values in the array of states for a vertex or an edge on disk for check-pointing.

As noted above, instantiations of a given sample graph at two consecutive time points may share a large number of common edges, which may result in similar vertex and edge states during graph computation. For iterative graph algorithms, such as Katz centrality and PageRank computation, this may provide an opportunity to use ending vertex and edge states of time t as the starting states for iterative computation at time t+1. In other words, an initial state for the execution of the algorithm on the sample graphs may be set to a final state of a previous execution of the algorithm. Improved starting states may lead to faster convergence. In other words, for some algorithms, but not all, final vertex and edge states calculated for a previous time may be used as a starting point for the current time. Using the calculations of a previous time, instead of starting from scratch, may significantly reduce algorithm execution time.

Referring again to FIG. 3A, the partial results from executing the algorithm on the sample graphs are combined, at operation 306, into a final result.

For example, as illustrated by FIG. 3B, result 1 358a is shown combined at operation 360 with result 2 358b and result N 358n. Each of the results 358a-358n may be generated by executing algorithm 356 on one or more corresponding sample graphs, as discussed above. Further, final result 362 is shown to be output from the combine operation 360. As an option, the combining at operation 360 may include an averaging of the results 358a-358n.

Combining the partial results into the final result may reduce Monte Carlo variability. For example, if executing the algorithm on a sample graph returns an influence score for each vertex of the sample graph, then executing the algorithm on the sample graphs may return a plurality of influence scores for a single vertex—one for each sample graph. Accordingly, each of the influence scores for a vertex may be averaged to compute an average per-vertex influence score at a time t. Executing the algorithm on the sample graphs may return a top x number of influencers for each of the sample graphs, and the top influencers may be combined in any known manner.

As an option, influence may be calculated utilizing a degree-centrality score, a Katz centrality score, etc. for each vertex. Accordingly, combining the results may include averaging the respective centralities.

In addition to combining the partial results into the final result 362, other values may be calculated based on the partial results 358 and/or the final result 362. For example, in some embodiments, a confidence interval, a standard deviation, etc., may be computed in addition to the final result. Moreover, the number of sample graphs generated by sampling a subsequent snapshot of the dynamic graph may be increased based on a calculated confidence interval.

In some embodiments, averaging of the partial results may not provide a meaningful result. Accordingly, the sample graphs may be combined, at operation 306, into the final result 362 in any suitable manner.

In the embodiments described above, a snapshot of a dynamic graph may be sampled in a temporally biased manner that allows direct application of static algorithms within a dynamic environment. In the various embodiments, overlap between sample graphs at a given time may be exploited, and/or overlaps between a given sample graph at different time points may be exploited, for efficiently storing the graphs and computing results. Additionally, by tuning parameters of the dynamic environment, recency and continuity of the sample graphs may be controlled in a manner that preserves the integrity of information that might otherwise be lost using prior art snapshot and sliding window models.

In contrast with such snapshot and sliding window models, the above-described probabilistic edge decay model may ensure the inclusion of top influencers (e.g., as calculated by degree centrality, etc.) that might otherwise be unaccounted for by the snapshot and/or sliding window models due to newness and/or dormancy, respectively. In addition, the probabilistic edge decay model may allow for controlling trade-offs between emphasizing recent interactions and providing continuity with respect to past interactions. Still yet, the probabilistic edge decay model may allow for compact aggregate representations of the sample graphs, efficient incremental updating methods of aggregate graphs/sample graphs, and efficient execution of already-existing algorithms against bulk sets of the sample graphs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
generating, by a computer, two or more sample graphs by sampling edges of a current snapshot of a dynamic graph, the snapshot of the dynamic graph having a plurality of vertices and a plurality of edges between the vertices, wherein each of the two or more sample graphs includes the same vertices;
generating, by the computer, two or more partial results by executing an algorithm on the two or more sample graphs;
combining, by the computer, the partial results, from executing the algorithm on the two or more sample graphs, into a final result thereby reducing storage consumption and execution time of the computer during analyzation of a dynamic graph;
incrementally maintaining, by the computer, the sample graphs;
using, by the computer, a hash function to generate one or more integers corresponding to one or more of the edges in one or more of the sample graphs, wherein the one or more integers corresponds to a life span of the respective one or more of the edges; and
converting, by the computer, each of the one or more integers into a pseudorandom sample using a geometric distribution of a life span of the respective one or more of the edges,
wherein each of the edges in the current snapshot has a timestamp associated therewith,
wherein sampling the edges of the current snapshot of the dynamic graph includes sampling the edges according to a decay function, such that sampling probability is non-increasing over time.

2. The computer-implemented method of claim 1, wherein initial vertex and/or edge states are set to a final state of vertex and/or edge states corresponding to a previous execution of the algorithm, wherein updates to vertex and/or edge states are propagated using message passing.

3. The computer-implemented method of claim 1, wherein sampling the edges of the current snapshot of the dynamic graph includes sampling the edges according to an exponential decay function, such that sampling probability is non-increasing over time.

4. The computer-implemented method of claim 1, comprising:
accumulating, by the computer, each of the sample graphs into a single aggregate graph by performing a union of the edges in each of the sample graphs; and
storing, by the computer, the single aggregate graph.

5. The computer-implemented method of claim 1, wherein edges included in the current snapshot of a dynamic graph and which were added to the dynamic graph in a most recent update thereto are included in each of the generated two or more sample graphs.

6. The computer-implemented method of claim 5, wherein incrementally maintaining the sample graphs includes:
subsampling each of the edges of each of the sample graphs at a given time by applying a Bernoulli trial, and
combining a result of the subsampling with new edges received in a batch corresponding to the given time to form new sample graphs.

7. The computer-implemented method of claim 5, wherein the edges are sampled using updating of a type selected from a group consisting of: lazy incremental updating and eager incremental updating.

8. The computer-implemented method of claim 1, wherein executing the algorithm on the sample graphs includes executing the algorithm on one or more bulk sets containing the sample graphs, by simultaneously executing the algorithm on the sample graphs included in each of the bulk sets, wherein each of the bulk sets comprise an aggregate graph, such that the algorithm is executed on at least one aggregate graph.

9. The computer-implemented method of claim 1, comprising:
generating, by the computer, additional sample graphs by sampling edges of a second subsequent snapshot of the dynamic graph,
wherein the two or more partial results are generated by executing the algorithm on the additional sample graphs in addition to the two or more sample graphs.

10. A computer program product comprising a computer readable storage medium having program instructions embodied therewith, the program instructions executable by a processor to cause the processor to:
generate, by the processor, two or more sample graphs by sampling edges of a current snapshot of a dynamic graph, wherein each of the two or more sample graphs includes the same vertices, the snapshot of the dynamic graph having a plurality of vertices and a plurality of edges between the vertices, wherein each of the two or more sample graphs includes a different subset of the plurality of edges between the vertices in the snapshot;
generate, by the processor, two or more partial results by executing an algorithm on the sample graphs;
combine, by the processor, the partial results, from executing the algorithm on the sample graphs, into a final result thereby reducing storage consumption and execution time of the processor during analyzation of a dynamic graph;
incrementally maintain, by the processor, the sample graphs;
accumulate, by the processor, each of the sample graphs into a single aggregate graph by performing a union of the edges in each of the sample graphs; and
store, by the processor, the single aggregate graph,
wherein incrementally maintaining the sample graphs includes:
subsampling each of the edges of each of the sample graphs at a given time by applying a Bernoulli trial, and
combining a result of the subsampling with new edges received in a batch corresponding to the given time to form new sample graphs.

11. The computer program product of claim 10, wherein initial vertex and/or edge states are set to a final state of vertex and/or edge states corresponding to a previous execution of the algorithm, wherein updates to vertex and/or edge states are propagated using message passing.

12. The computer program product of claim 10, wherein sampling the edges of the current snapshot of the dynamic graph includes sampling the edges according to an exponential decay function, such that sampling probability is non-increasing over time.

13. The computer program product of claim 12, wherein the program instructions are executable by the processor to cause the processor to:
use, by the processor, a bitmap to indicate which of the sample graphs each of the plurality of edges corresponds to.

14. The computer program product of claim 10, wherein the edges are sampled using updating of a type selected from a group consisting of: eager incremental updating and lazy incremental updating.

15. The computer program product of claim 10,
wherein the program instructions are executable by the processor to cause the processor to:
use, by the processor, a hash function to generate one or more integers corresponding to one or more of the edges in one or more of the sample graphs, wherein the one or more integers corresponds to a life span of the respective one or more of the edges; and
convert, by the processor, each of the one or more integers into a pseudorandom sample using a geometric distribution of a life span of the respective one or more of the edges,
wherein each of the edges in the current snapshot has a timestamp associated therewith,
wherein sampling the edges of the current snapshot of the dynamic graph includes sampling the edges according to a decay function, such that sampling probability is non-increasing over time.

16. The computer program product of claim 10, wherein executing the algorithm on the sample graphs includes executing the algorithm on one or more bulk sets containing the sample graphs, by simultaneously executing the algorithm on the sample graphs included in each of the bulk sets, wherein the bulk set comprises an aggregate graph, such that the algorithm is executed on the aggregate graph.

17. The computer program product of claim 10,
wherein the program instructions are executable by the processor to cause the processor to:
generate, by the processor, additional sample graphs by sampling edges of a second subsequent snapshot of the dynamic graph,
wherein the two or more partial results are generated by executing the algorithm on the additional sample graphs in addition to the two or more sample graphs.

18. A system comprising:
a processor and logic integrated with and/or executable by the processor, the logic being configured to:
generate, by the processor, two or more sample graphs by sampling edges of a current snapshot of a dynamic graph, the snapshot of the dynamic graph having a plurality of vertices and a plurality of edges between the vertices, wherein each of the two or more sample graphs includes the same vertices, wherein each of the two or more sample graphs includes a different subset of the plurality of edges between the vertices in the snapshot;
generate, by the processor, two or more partial results by executing an algorithm on the sample graphs,
wherein executing the algorithm on the sample graphs includes performing a union of the subset of edges in each of the sample graphs,
wherein results of the union form edges in two or more partial results,
wherein each of the edges in the two or more partial results includes a notation which indicates the one or more sample graphs which the respective edge corresponds to;
combine, by the processor, the partial results, from executing the algorithm on the sample graphs, into a final result thereby reducing storage consumption and execution time of the processor during analyzation of a dynamic graph; and
incrementally maintain, by the processor, the sample graphs.

19. The system of claim 18, wherein initial vertex and/or edge states are set to a final state of vertex and/or edge states corresponding to a previous execution of the algorithm, wherein updates to vertex and/or edge states are propagated using message passing.

20. The system of claim 18, wherein sampling the edges of the current snapshot of the dynamic graph includes sampling the edges according to a decay function, such that sampling probability is non-increasing over time, wherein the dynamic graph represents a plurality of social interactions.

21. The system of claim 18, wherein incrementally maintaining the sample graphs includes:
subsampling each of the edges of each of the sample graphs at a given time based on a decay probability, and
combining a result of the subsampling with new edges received in a batch corresponding to the given time to form new sample graphs.

22. The system of claim 21, the logic being configured to:
use, by the processor, a hash function to generate one or more integers corresponding to one or more of the edges in one or more of the sample graphs, wherein the one or more integers corresponds to a life span of the respective one or more of the edges;
convert, by the processor, each of the one or more integers into a pseudorandom sample using a geometric distribution of a life span of the respective one or more of the edges;
use, by the processor, a bitmap to indicate which of the sample graphs each of the plurality of edges corresponds to;
accumulate, by the processor, each of the sample graphs into a single aggregate graph by performing a union of the edges in each of the sample graphs; and
store, by the processor, the single aggregate graph,
wherein each of the edges in the current snapshot has a timestamp associated therewith,
wherein sampling the edges of the current snapshot of the dynamic graph includes sampling the edges according to a decay function, such that sampling probability is non-increasing over time,
wherein initial vertex and edge states are set to a final state of respective vertex and edge states corresponding to a previous execution of the algorithm,
wherein edges included in the current snapshot of a dynamic graph and which were added to the dynamic graph in a most recent update thereto are included in each of the generated two or more sample graphs,
wherein subsampling each of the edges of each of the sample graphs at a given time based on a decay probability includes applying a Bernoulli trial.

* * * * *